United States Patent
Malladi et al.

(10) Patent No.: US 9,622,228 B2
(45) Date of Patent: Apr. 11, 2017

(54) DATA AND CONTROL MULTIPLEXING IN WIRELESS COMMUNICATIONS

(75) Inventors: Durga Prasad Malladi, San Diego, CA (US); Juan Montojo, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 12/764,736

(22) Filed: Apr. 21, 2010

(65) Prior Publication Data
US 2011/0110296 A1 May 12, 2011

Related U.S. Application Data

(60) Provisional application No. 61/175,388, filed on May 4, 2009.

(51) Int. Cl.
*H04B 7/212* (2006.01)
*H04W 72/04* (2009.01)
*H04B 1/713* (2011.01)

(52) U.S. Cl.
CPC .......... *H04W 72/042* (2013.01); *H04B 1/713* (2013.01)

(58) Field of Classification Search
USPC ................... 370/310–350, 432–463
See application file for complete search history.

(56) References Cited

U.S. PATENT DOCUMENTS

| | | | |
|---|---|---|---|
| 2004/0137849 A1* | 7/2004 | Kloper et al. | 455/67.11 |
| 2008/0212514 A1 | 9/2008 | Chen | |
| 2008/0212520 A1 | 9/2008 | Chen et al. | |
| 2008/0220791 A1* | 9/2008 | Cho et al. | 455/450 |
| 2009/0109914 A1* | 4/2009 | McBeath et al. | 370/329 |
| 2011/0002290 A1* | 1/2011 | Kim et al. | 370/329 |
| 2011/0274066 A1* | 11/2011 | Tee et al. | 370/329 |
| 2011/0275363 A1* | 11/2011 | Kwon | H04W 48/18 455/422.1 |

(Continued)

FOREIGN PATENT DOCUMENTS

WO WO-2008057843 A2 5/2008

OTHER PUBLICATIONS

U.S. Appl. No. 61/111,034.*

(Continued)

*Primary Examiner* — Ricky Ngo
*Assistant Examiner* — Wei-Po Kao
(74) *Attorney, Agent, or Firm* — Charles Chesney

(57) ABSTRACT

Systems and methodologies are described that facilitate defining a new control region over resources allocated for communicating general non-control data in a legacy network specification. The new control region can comprise multiple control channels, which can be multiplexed together and/or with general data channels. Devices can receive control data over the new control region as well as information regarding the region, such as location of the region, location of specific resources, multiplexing schemes, frequency hopping patterns, and/or the like to appropriately decode relevant control data. This allows for expanded control resources to support multicarrier assignments, large numbers of devices being addressed, special operation modes, new downlink control information (DCI) formats, and/or the like.

54 Claims, 17 Drawing Sheets

(56) References Cited

U.S. PATENT DOCUMENTS

2012/0044899 A1* 2/2012 Kwon et al. ............... 370/329

OTHER PUBLICATIONS

International Search Report and Written Opinion—PCT/US2010/033619—International Search Authority, European Patent Office, Oct. 22, 2010.
R. Marks, et al., "802.16m Frame Structure to Enable Legacy Support, Technology Evolution, and Reduced Latency" [0nline] Nov. 7, 2007 (Nov. 7, 2007), pp. 1-7, XP002598096 NextWave Broadband Inc. Retrieved from the Internet: URL:http://wireless-man.org/tgm/contri b/C80 216m-07_263.pdf> [retrieved on Aug. 25, 2010] p. 2, paragraph 2—p. 4 page 5, paragraph 3.1—p. 6.
ZTE: "Downlink Control Signalling Design for LTE-A" 3GPP Draft; R1-091429 Downlink Control Signalling Design for LTE-A, 3rd Generation Partnership Project (3GPP), Mobile Competence Centre ; 650, Route Des Lucioles ; F-06921 Sophia-Antipolis Cedex ; France, No. Seoul, Korea; 20090317, Mar. 17, 2009 (Mar. 17, 2009), XP050339008 p. 2, paragraph 6.1—p. 3.
Taiwan Search Report—TW099114283—TIPO—Feb. 4, 2013.
Motorola, "Common PDCCH Design for Carrier Aggregation", 3GPP TSG-RAN1 #56bis, R1-091327, Mar. 27, 2009.
Nortel Networks, "Control channel design for the support of wider bandwidth for LTE-Advanced", 3GPP TSG-RAN1 #56, R1-090759, and Feb. 13, 2009.
Nortel Networks, "Support of Wider Bandwidth for LTE-Advanced", 3GPP TSG-RAN1 #55, R1-084474, Nov. 14, 2008.

* cited by examiner

DATA AND CONTROL MULTIPLEXING IN WIRELESS COMMUNICATIONS

CROSS-REFERENCE

This application claims the benefit of U.S. Provisional Application Ser. No. 61/175,388, filed May 4, 2009, and entitled "LTE ADVANCED CONTROL AND DATA MULTIPLEXING," the entirety of which is incorporated herein by reference.

BACKGROUND

I. Field

The present disclosure relates generally to wireless communications and more specifically to defining new control data regions in legacy wireless communications systems.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, access points and mobile devices (and other devices in a wireless communications system) can communicate according to a specification, such as 3GPP LTE. The specification can define communication parameters, such as channels represented by portions of frequency over time. Channels can be specified for general data communications as well as control data, which can relate to communication quality over general data channels. In LTE, the channels can include, for example, physical downlink control channel (PDCCH), physical downlink shared channel (PDSCH), etc. With advances in wireless communication technology, however, PDCCH may be insufficient for communicating control data. For example, multicarrier assignments, larger numbers of devices to be addressed, new operation modes, new downlink control information (DCI) formats, and/or the like, can require additional resources to effectively communicate related control data.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating defining a new control data region in general data resources of a legacy network specification. For example, the legacy network specification can be a third generation partnership project (3GPP) long term evolution (LTE) specification that defines a control data region at the beginning of a resource block (RB) with general data regions that follow. A new control data region can be defined within the general data regions to expand available control resources. In addition, control data related to a device can be multiplexed in the new control region with control data related to a disparate device or general data related to the device or disparate device. Such flexible design and usage of the new control region allows for efficient use of resources for control and general data.

According to related aspects, a method is provided that includes receiving a signal from an access point over resources reserved for general data communication in a legacy network specification. The method also includes determining location of control data within the resources and decoding control data from a portion of the signal received at the location within the resources.

Another aspect relates to a wireless communications apparatus. The wireless communications apparatus can include at least one processor configured to receive a signal from an access point over resources allocated for general data communications in a legacy network specification. The at least one processor is further configured to discern a location of control data in the resources based at least in part on a disparate network specification and decode the control data from a portion of the signal received over the resources based at least in part on the location. The wireless communications apparatus also comprises a memory coupled to the at least one processor.

Yet another aspect relates to an apparatus. The apparatus includes means for receiving a signal from an access point over resources defined in a legacy network specification for general data communication. The apparatus further includes means for locating a portion of the resources over which control data is received in the signal and means for decoding control data from the portion of the resources.

Still another aspect relates to a computer program product, which can have a computer-readable medium including code for causing at least one computer to receive a signal from an access point over resources reserved for general data communication in a legacy network specification. The computer-readable medium can also comprise code for causing the at least one computer to determine location of control data within the resources and code for causing the at least one computer to decode control data from a portion of the signal received at the location within the resources.

Moreover, an additional aspect relates to an apparatus including a receiving component that receives a signal from an access point over resources defined in a legacy network specification for general data communication. The apparatus can further include a control region determining component that locates a portion of the resources over which control data is received in the signal and a control data decoding component that decodes control data from the portion of the resources.

According to further aspects, a method is provided that includes communicating in a wireless network according to a legacy network specification. The method additionally includes defining a control region over resources reserved for general data communication in the legacy network specification and transmitting control data in the control region to one or more wireless devices.

Another aspect relates to a wireless communications apparatus. The wireless communications apparatus can include at least one processor configured to communicate with one or more legacy devices in a wireless network using a legacy network specification and create a control region for transmitting control data in resources allocated for communication general data according to the legacy network specification. The at least one processor is further configured to transmit control data in the control region to one or more wireless devices. The wireless communications apparatus also comprises a memory coupled to the at least one processor.

Yet another aspect relates to an apparatus. The apparatus includes means for communicating in a wireless network according to a legacy network specification. The apparatus further includes means for defining a control region over resources reserved for general data communication in the legacy network specification, wherein the means for communicating in the wireless network transmits control data in the control region to one or more wireless devices.

Still another aspect relates to a computer program product, which can have a computer-readable medium including code for causing at least one computer to communicate in a wireless network according to a legacy network specification and code for causing the at least one computer to define a control region over resources reserved for general data communication in the legacy network specification. The computer-readable medium can also comprise code for causing the at least one computer to transmit control data in the control region to one or more wireless devices.

Moreover, an additional aspect relates to an apparatus including a transmitting component that communicates in a wireless network according to a legacy network specification. The apparatus can further include a control region defining component that creates a control region over resources reserved for general data communication in the legacy network specification, wherein the transmitting component provides control data in the control region to one or more wireless devices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
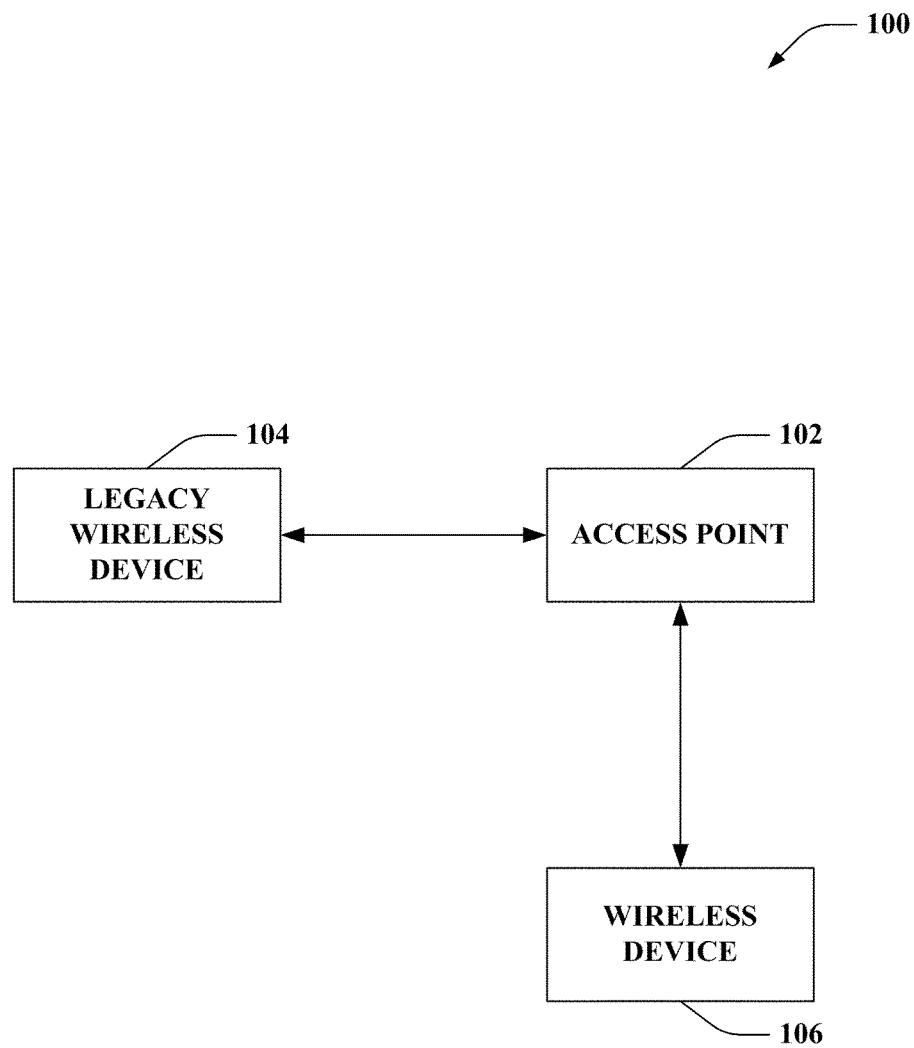
FIG. 1 is a block diagram of a system for defining a new control region over legacy general data resources.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates communicating control data over a new control region defined over general data resources (e.g., non-control resources) in a legacy network specification. An access point 102 is provided that communicates with a legacy wireless devices 104 and a wireless device 106. Access point 102 can be a macrocell access point, femtocell or picocell access point, disparate wireless device, portions thereof, or substantially any device that provides access to a wireless network. In addition, legacy wireless device 104 and wireless device 106 can be mobile devices, portions thereof, or substantially any device that receives access to a wireless network.

According to an example, access point 102 can communicate with the legacy wireless device 104 according to a legacy network specification, such as 3GPP LTE. For example, the legacy network specification can define channels for communicating control and general data between the access point 102 and legacy wireless device 104, where the channels comprise portions of frequency over time. In one example, the channels can be comprised of one or more, or a portion of, resource blocks (RB). An RB can refer to a portion of frequency over a portion of time, such as a frequency portion of a plurality of contiguous orthogonal frequency division multiplexing (OFDM) symbols. In addition, the access point 102 can communicate with wireless device 106 over a new network specification. The new network specification, however, can require additional resources for communicating control data to handle multi-carrier assignments, larger number of supportable devices, new downlink control information (DCI) formats, special device operation modes, and/or the like.

To retain some backward compatibility with the legacy network specification while extending control resources, the new network specification can communicate control data over resources of the legacy network specification defined for general data, for example. In an example, access point 102 can transmit location of the new control region to wireless device 106 in a system information block (SIB). In another example, the access point 102 can transmit specific location of control resources within the new control region relevant to the wireless device 106 using dedicated signal. In either case, the access point 102 can transmit control data over the control resources in the new control region. As described, the control data can relate to quality information for general data communications over a related data channel.

In addition, access point 102 can multiplex control data within the new control region with other control data for other devices, general data for the wireless device 106 or other devices from the access point 102, and/or the like. In one example, the new control regions can be defined per RB allowing general data transmission to be multiplexed over remaining resources in each RB. In another example, the new control region can be defined in contiguous resource elements (e.g., portions of an RB, such as time portions of an RB) in one or more contiguous RBs, where unused resource elements can be used for multiplexing general data. It is to be appreciated that the concepts described above and herein can additionally or alternatively be implemented for uplink control communications.

Figure 2:
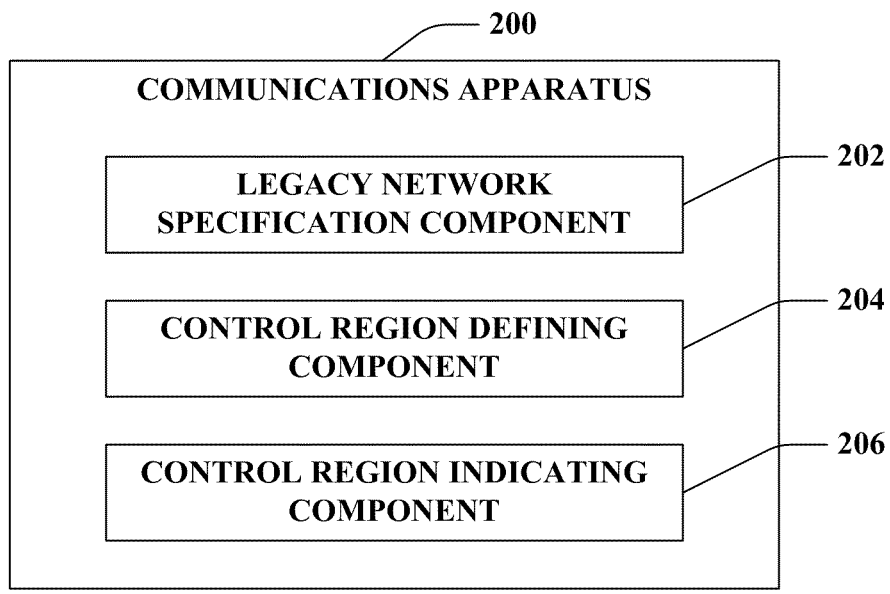
FIG. 2 is an illustration of an example communications apparatus for employment within a wireless communications environment.

Referring next to FIG. 2, a communications apparatus 200 that can participate in a wireless communications network is illustrated. The communications apparatus 200 can be an access point, a portion thereof, or substantially any device that can provide access to a wireless network, such as a mobile device in a peer-to-peer configuration, mobile base station, relay node, and/or the like. The communications apparatus 200 can include a legacy network specification component 202 that can receive information or parameters related to a legacy network specification, a control region defining component 204 that can specify legacy general data resources to be used for transmitting control data according to a new network specification, and a control region indicating component 206 that can communicate information regarding a newly defined control region to one or more devices.

According to an example, the legacy network specification component 202 can receive a legacy network specification (e.g., from a network component, hardcoding, configuration, etc.). The legacy network specification can define communications resources, such as channels, for communicating wireless data between devices in the network. For example, channels can comprise a number of RBs in a communication frame. The communication frame can be defined as a collection of contiguous or non-contiguous OFDM symbols over a period of time, in one example. As described, a RB can relate to a frequency portion of the collective OFDM symbols in the communication frame. In one example, the legacy network specification can be a 3GPP LTE specification where physical downlink control channel (PDCCH) resources are defined over the first zero to three OFDM symbols in a communication frame where for a given RB, the first zero to three symbol portions of the RB are reserved for control data regarding a data channel defined in the remainder of the RB.

Control region defining component 204 can create a control data region in data resources of the legacy network specification to facilitate expanding the control region. This can be useful, for example, in new network specifications, such as LTE-Advanced, that allow multicarrier communications, larger number of devices being addressed, new DCI formats, special operating modes, etc. In one example, control region defining component 204 can reserve a portion of each RB for control data, a plurality of contiguous RBs, and/or the like. Control region indicating component 206 can transmit data regarding the newly defined control region to devices in the wireless network. For example, the control region indicating component 206 can generate a SIB that defines the new control region and broadcast the SIB in the network. In another example, the control region indicating component 206 can transmit specific location of control resources related to given devices in dedicated signaling.

Figure 3:
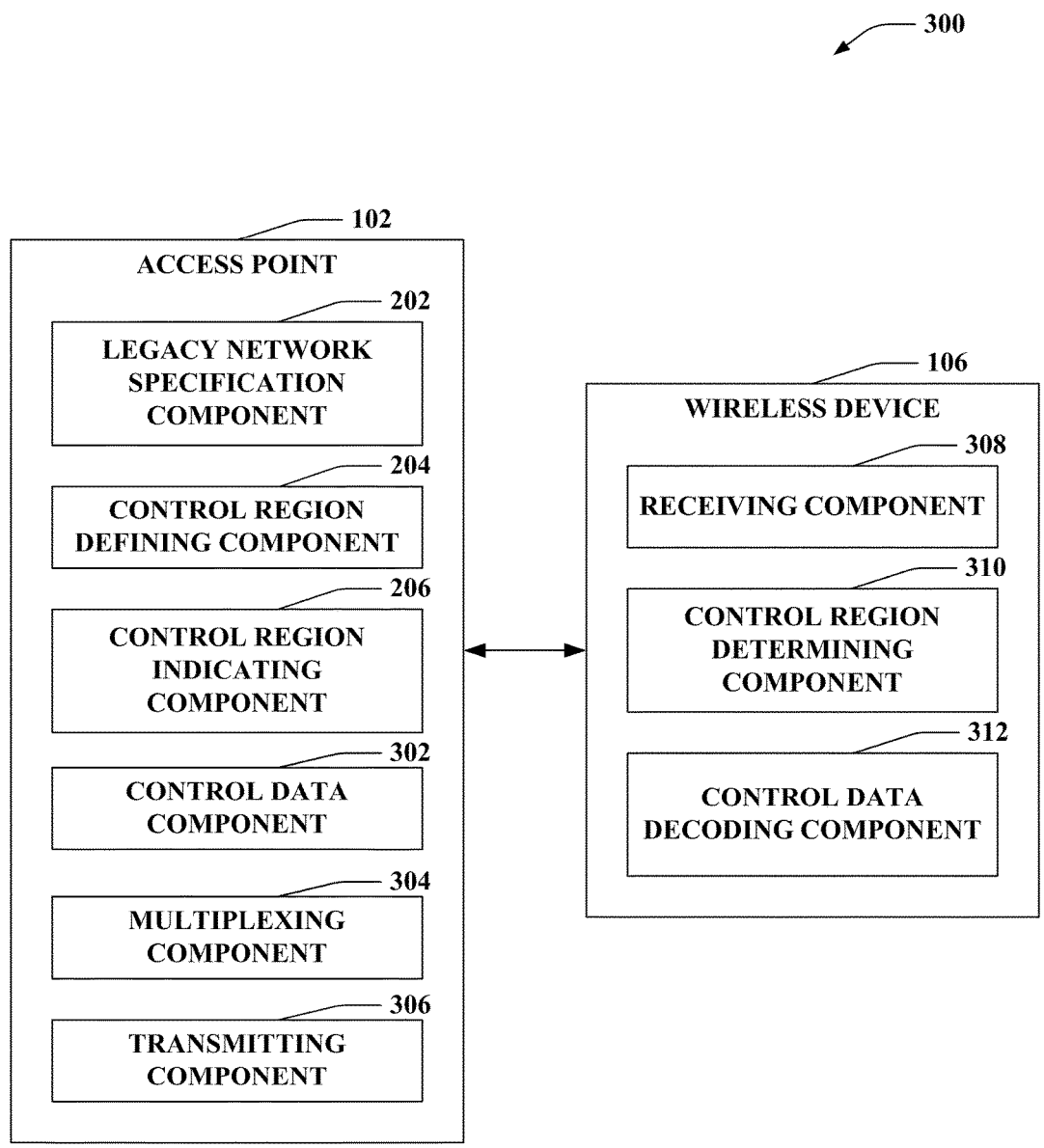
FIG. 3 illustrates an example wireless communication network that effectuates defining and communicating control data over a new control region.

Now referring to FIG. 3, illustrated is a wireless communications system 300 that facilitates defining a new control region in general data resources of a legacy network specification. Access point 102, as described, can be substantially any type of base station or mobile device (including not only independently powered devices, but also modems, for example) that provides wireless network access, and/or portion thereof. In addition, wireless device 106 can be a mobile device, another device, or a portion thereof, that receives wireless network access. Moreover, system 300 can be a MIMO system and/or can conform to one or more wireless network system specifications (e.g., EV-DO, 3GPP, 3GPP2, 3GPP LTE, WiMAX, etc.). In addition, it is appreciated that the functionalities described in terms of downlink communication herein can also be applied to uplink communications, in one example.

Access point 102 can comprise a legacy network specification component 202 that receives or otherwise can employ a legacy network specification, a control region defining component 204 that can create a new control region over resources assigned to general data communications by the legacy network specification, a control region indicating component 206 that can provide information regarding the new control region to devices in a wireless network, a control data component that can generate control data related to communications with one or more devices, a multiplexing component 304 that can multiplex control data signals in the new control region, and a transmitting component 306 that can transmit control data signals to one or more wireless devices. Wireless device 106 can comprise a receiving component 308 that receives information regarding a new control region as well as control data signals over the resources of the new control region, a control region determining component 310 that can discern location of the new control region, and a control data decoding component 312 that can decode control data transmitted in the new control region.

According to an example, the legacy network specification component 202 can obtain a legacy network specification from hardcoding, one or more network components, and/or the like. The legacy network specification, as described, can define resources related to control and/or data channels, such as PDCCH, PDSCH, etc., for a 3GPP LTE network specification. Thus, resources that can be utilized for such channels can be hardcoded in legacy network specification component 202, in one example, and the access point 102 can communicate appropriate data over the channels to legacy wireless devices (not shown) using the resources. The control region defining component 204 can select resources allocated for general data communications in the legacy network specification to be utilized for control data communications in a new network specification. The control region indicating component 206 can transmit information regarding the selected resources in a wireless network to the wireless device 106 or other devices in the wireless network.

In one example, the control region indicating component 206 can generate an SIB specifying control region location and utilize the transmitting component 306 to broadcast the SIB in a wireless network. In another example, the control region indicating component 206 can generate a dedicated signal for a specific wireless device, such as wireless device 106, specifying location of control data within the control region related to the wireless device, and transmitting component 306 can transmit the dedicated signal to the wireless device. Moreover, for example, the control region indicating component 206 can define a search space for a wireless device specifying one or more resource blocks, and/or locations within the resource blocks, that may comprise control data for the wireless device. Furthermore, for example, the control region defining component 204 can generate a frequency hopping pattern (or one or more disparate interference mitigation techniques) for control data in the new control region. In this example, the control region indicating component 206 can include the hopping pattern or other interference mitigation information in communications transmitted to the wireless device 106 via transmitting component 306.

In an example, the receiving component 308 can receive the SIB or dedicated signal, and the control region determining component 310 can discern location of the new control region from the SIB or location of specific control data according to the dedicated signal in the legacy general data resources. In another example, the control region determining component 310 can determine location of the new control region based on hardcoding, according to a network specification, provisioning from one or more disparate network components, configuration, and/or the like. Since legacy resources are being used, legacy devices can still be supported by an access point also providing the new control region. Control data component 302 can generate control data regarding communications with the wireless device 106 and schedule the control data over a portion of resources (e.g., a control channel) defined in the new control region. Moreover, if frequency hopping or other interference mitigation is utilized, the control data component 302 can schedule control data accordingly. Multiplexing component 304 can multiplex control channels with control channels for other devices, general data channels for wireless device 106 or other devices, and/or the like, as described.

For example, the control region defining component 204 can allocate one control channel per RB and the remainder of the RB can be allocated to a general data channel. In this example, the multiplexing component 304 can multiplex the control channel with a related data channel. In another example, the control region defining component 204 can allocate multiple channels per RB (e.g., the new control region can be filled in time rather than frequency over the legacy network specification general data resources). Unused resource block portions following the last control channel can be allocated for general data. In this example, the multiplexing component 304 can multiplex the contiguous control channels in the fully used RBs and can multiplex the control channels in the last RB with any data channels allocated in an unused portion, as described. The transmitting component 306 can transmit the signals with multiplexed control data and/or data over the wireless network, and the receiving component 308 can receive the signals.

The control region determining component 310, as described, can discern location of the new control region (e.g., from an SIB), and the control data decoding component 312 can blindly decode control data from the received signals until it encounters control data relevant to the wireless device 106. In another example, the SIB can specify multiplexing information, which the control data decoding component 312 can utilize to ensure it is decoding control portions of the new control region. Moreover, for example, the SIB can indicate format of control data in the new control region, such as control data being only at the beginning of RBs, and the control data decoding component 312 can follow the format information to decode control data over the resources comprising the new control region. In yet another example, as described, the control region determining component 310 can locate control data specific to the wireless device 106 based on a dedicated signal, and the control data decoding component 312 can decode the control data. In addition, where frequency hopping or other interference mitigation is present, control region determining component 310 can discern hopping pattern or other interference mitigation information from a dedicated signal, SIB, and/or the like, and the control data decoding component 312 can follow the pattern or information to decode its intended control data, for example.

Figure 4:
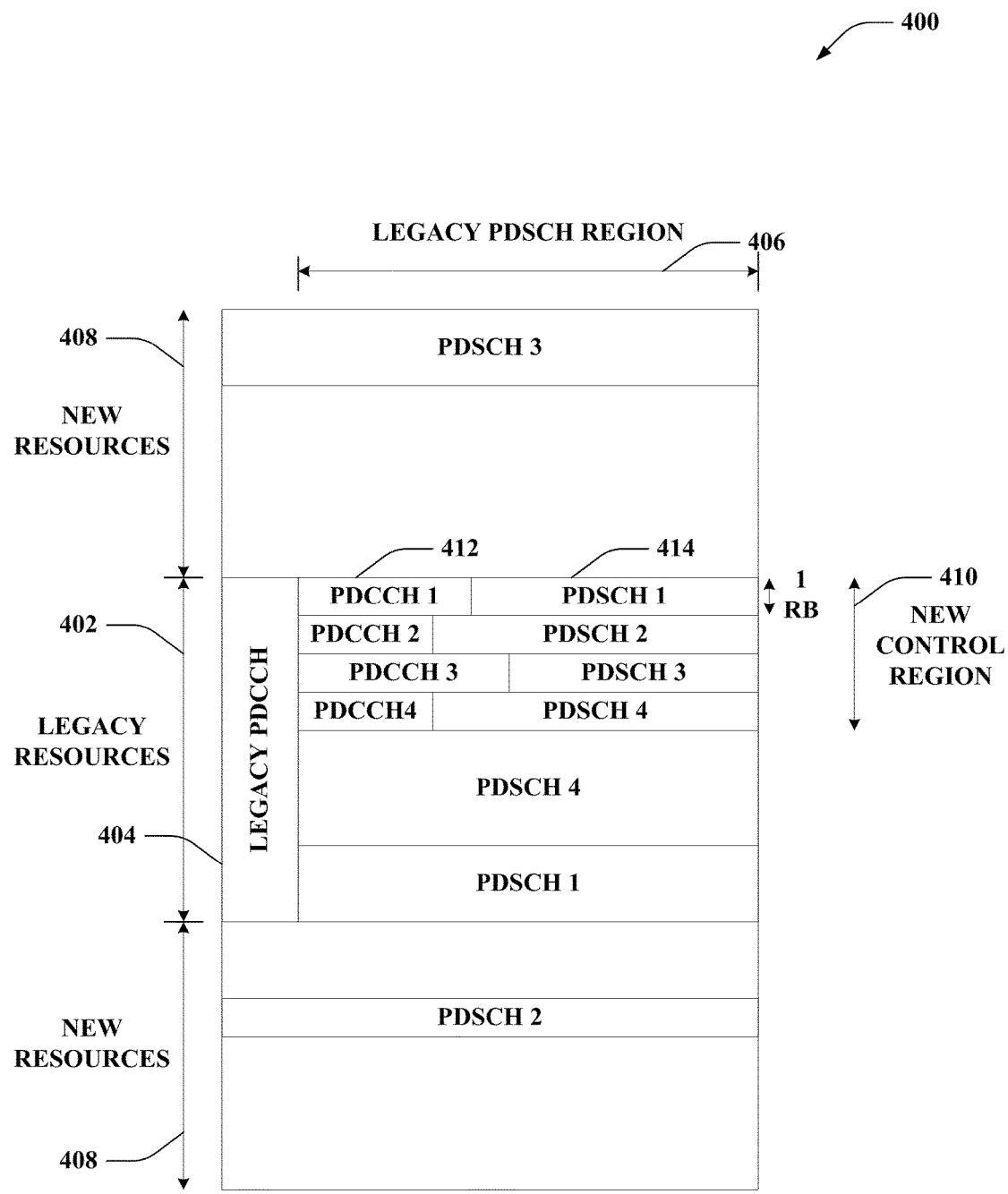
FIG. 4 illustrates an example portion of communication resources having a control region defined over legacy general data resources.

Referring to FIG. 4, an example portion of wireless communications resources 400 is illustrated in conjunction with providing a new control region in a wireless network using a legacy network specification. In particular, the resources 400 can be a collection of contiguous OFDM symbols, forming a communication frame. The resources 400 include legacy resources 402 defined in a legacy network specification, which includes a legacy PDCCH portion 404 and a legacy PDSCH region 406. The legacy resources 402, as depicted however, include the legacy PDSCH region 406 excluding new resources 408. The new resources 408, rather, can be defined in a new network specification as an extension of the legacy resources 402. The new resources 408 can be allocated for control and/or data communications, for example. In an example, the legacy resources 402 shown can relate to 3GPP LTE where the legacy PDCCH 404 is defined as the first zero to three OFDM symbols of the communication frame, and RBs in the legacy PDCCH 404 can relate to adjacent RBs in the legacy PDSCH region 406.

As described herein, one or more devices operating according to the new network specification can define a new control region 410 in legacy general data resources (e.g., legacy PDSCH region 406 portion of the legacy resources 402). As shown, for example, resources for PDCCH 1 412 can be allocated in the new control region 410 at the beginning of the RB, and resource for PDSCH 1 414 (which can relate to PDCCH 1) can be partially allocated at the end of the RB (the other portion, in this example, is allocated at the end of the legacy resources 402 frequency range). Thus, data transmitted over PDCCH 1 412 and PDSCH 1 414 can be multiplexed. This can additionally occur for other PDCCH and PDSCH resources shown in the new control region 410. In addition, full RB's of the new control region 410 that are not utilized for control can be scheduled for data. As described, a device receiving signals over the resources can blindly decode the new control region 410 based on a received location of the control region, decode the beginning of each RB according to received control data format information, decode a specific PDCCH based on received information in a dedicated signal or a designated search space, and/or the like, to obtain relevant control data.

Figure 5:
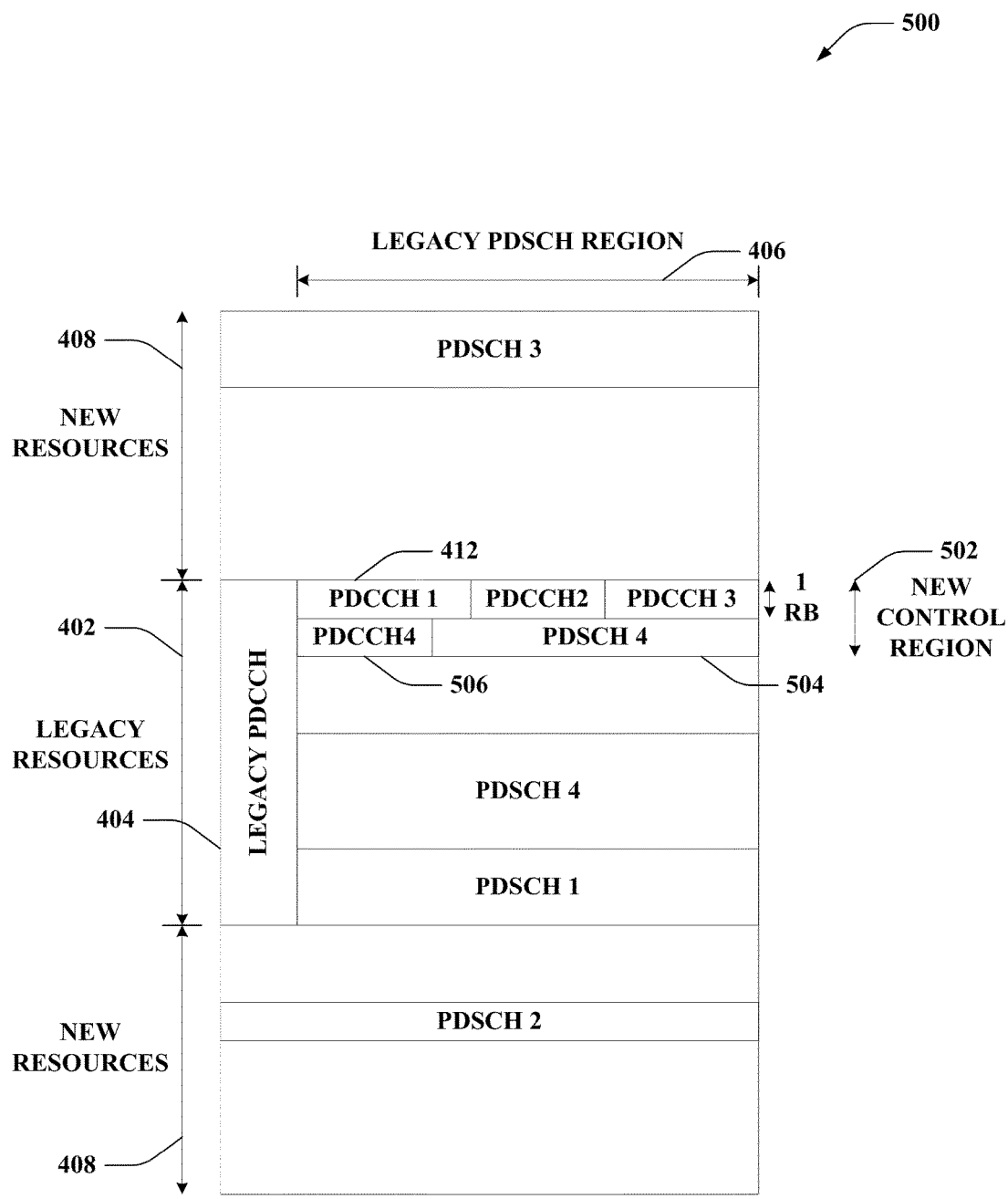
FIG. 5 illustrates an example portion of communication resources having a control region defined over resources allocated for general data communications in a legacy network specification.

Referring to FIG. 5, an example portion of wireless communications resources 500 is illustrated in conjunction with providing a new control region in a wireless network using a legacy network specification. In particular, the resources 500 can be a collection of contiguous OFDM symbols, forming a communication frame. The resources 500 include legacy resources 402 defined in a legacy network specification, which includes a legacy PDCCH portion 404 and a legacy PDSCH region 406. The legacy resources 402, as depicted however, include the legacy PDSCH region 406 excluding new resources 408. The new resources 408, rather, can be defined in a new network specification as an extension of the legacy resources 402. The new resources 408 can be allocated for control and/or data communications, for example. In an example, the legacy resources 402 shown can relate to 3GPP LTE where the legacy PDCCH 404 is defined as the first zero to three OFDM symbols of the communication frame, and RBs in the legacy PDCCH 404 can relate to adjacent RBs in the legacy PDSCH region 406.

As described herein, one or more devices operating according to the new network specification can define a new control region 502 in legacy general data resources (e.g., legacy PDSCH region 406 portion of the legacy resources 402). As shown, for example, resources for the PDCCHs, such as PDCCH 1 412, can be allocated in the new control region 502 in contiguous RBs (e.g., the new control region 502 is filled in time and then in frequency). The remaining portion of the last RB used for the new control region 502 can be allocated to PDSCH 4 504. Thus, data transmitted over PDCCHs can be multiplexed over the multiple RBs, and PDCCH 4 506 can be multiplexed with data channel PDSCH 4 504. In addition, full RB's of the new control region 502 that are not utilized for control can be scheduled for data. As described, a device receiving signals over the resources can blindly decode the new control region 410 based on receiving a location thereof, decode a specific PDCCH based on received information in a dedicated signal, and/or the like to receive control data.

Figure 6:
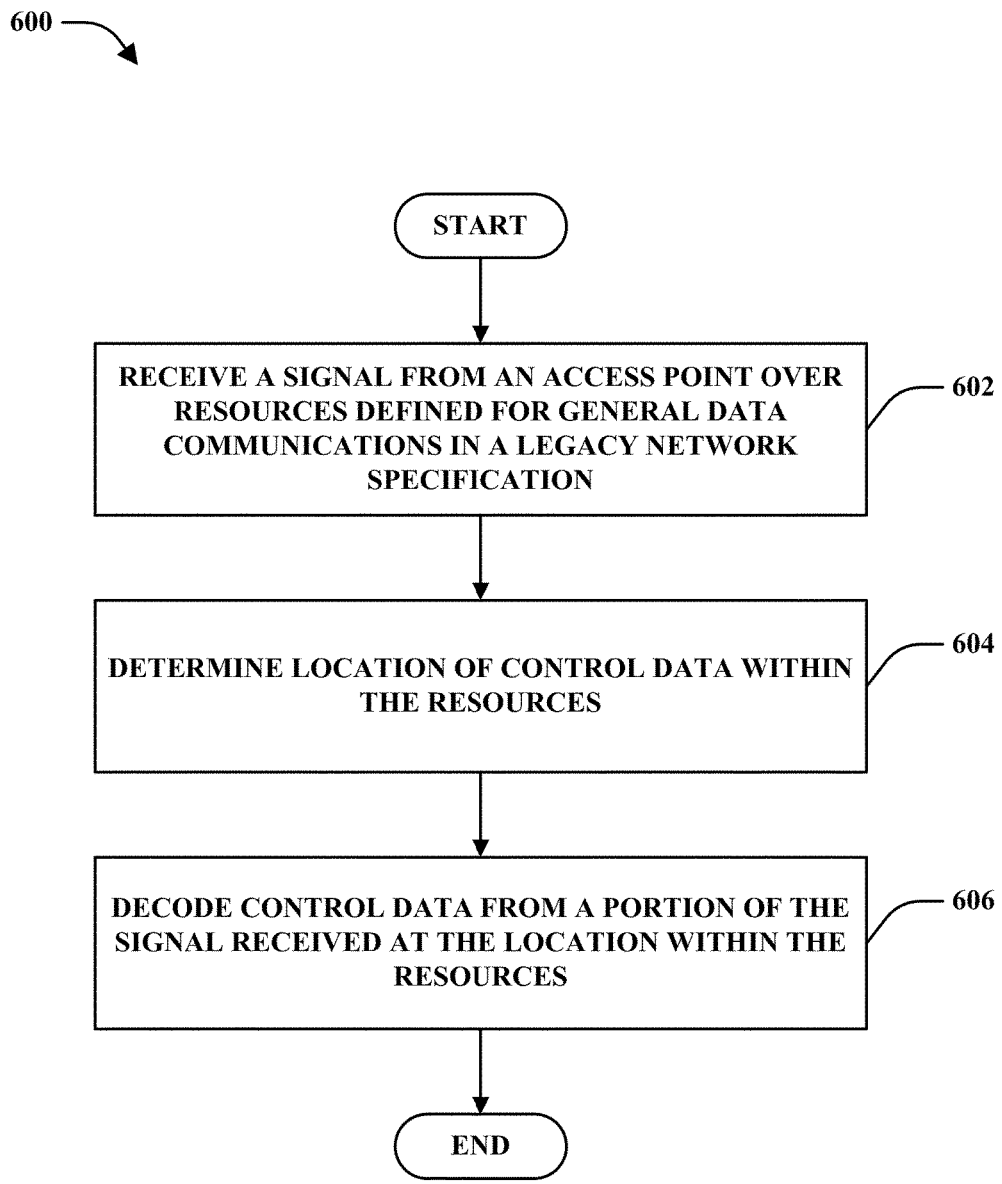
FIG. 6 is a flow diagram of an example methodology that receives communications over new control region.
Figure 7:
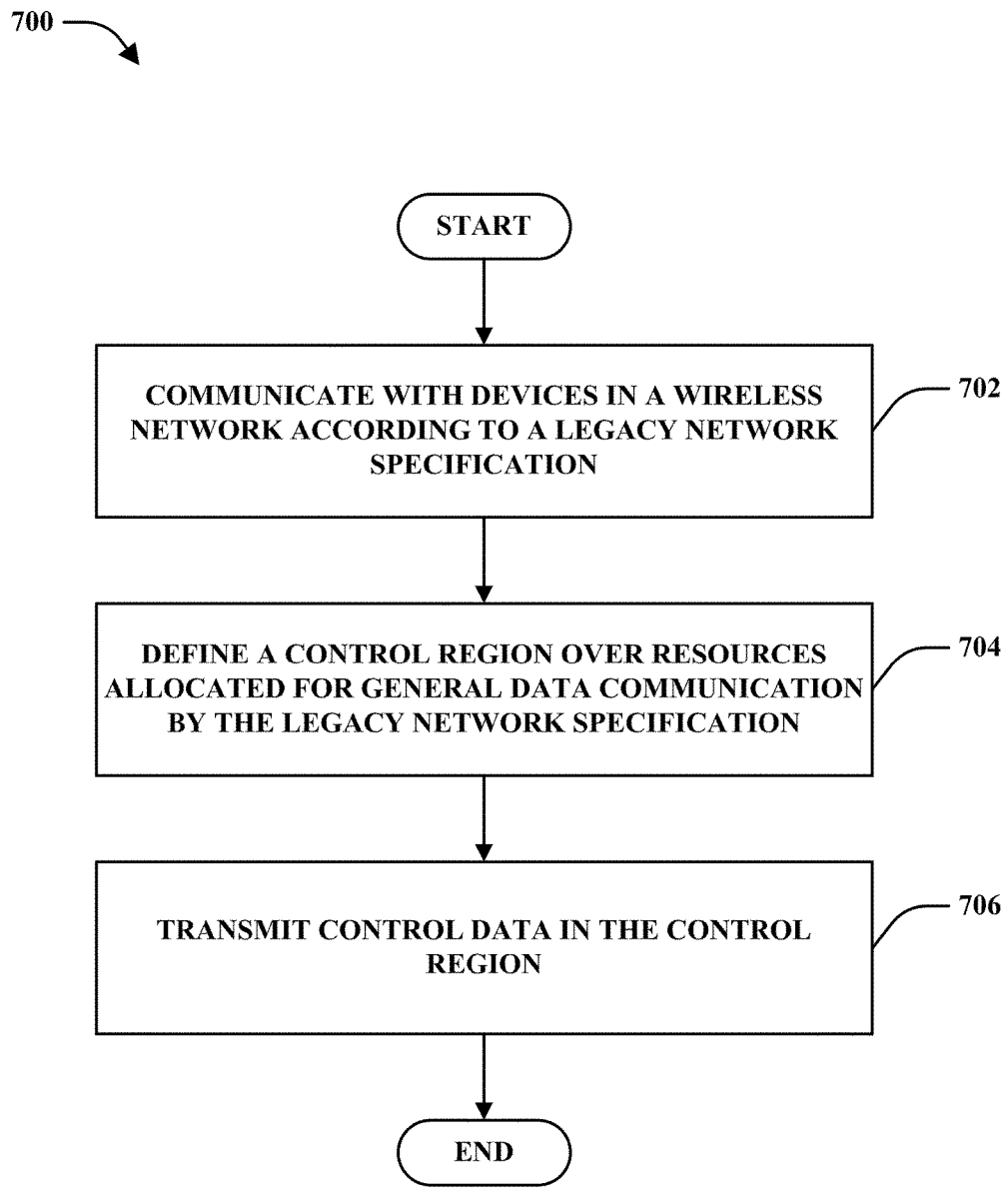
FIG. 7 is a flow diagram of an example methodology that defines a new control region for transmitting control data.

Referring now to FIGS. 6-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is a methodology 600 for receiving control data over a newly defined control region. At 602, a signal can be received from an access point over resources defined for general data communications in a legacy network specification. As described, in one example, the legacy network specification can be 3GPP LTE, and the resources can be defined for PDSCH communications. At 604, location of control data can be determined within the resources. For example, an explicit location or search space can be received in a dedicated signal from the access point, a control region location can be received in a SIB or based on a new network specification (e.g., obtained from hardcoding, a configuration, etc.), and/or the like. At 606, control data can be decoded from a portion of the signal received at the location within the resources. Where the control region location is received, for example, decoding can occur blindly until relevant control data is decoded. Moreover, for example, decoding the control data can include demultiplexing control data from other control data, other general data, etc., based on received multiplexing scheme information. Thus, legacy data resources can be used for control transmissions to facilitate efficient use of control resources without interrupting legacy communications.

Turning to FIG. 7, a methodology 700 is illustrated that facilitates creating a new control region over legacy network general data resources. At 702, devices in a wireless network can be communicated with according to a legacy network specification 702. In one example, the legacy network specification can be received from one or more network components, received as a configuration, hardcoded, etc., as described. At 704, a control region can be defined over resources allocated for general data communication by the legacy network specification. As described, the new control region can include one or more channels or collections of resources multiplexed in various resource blocks of the general data communication resources. This allows for increased control resources to support modifications in the wireless network, such as multicarrier support, large number of devices being addressed, special operation modes, new DCI formats, and/or the like. At 706, control data can be transmitted in the control region. In addition, the control data can be multiplexed with control data related to disparate wireless devices, general data, and/or the like, as described, to efficiently use the resources. Moreover, control data can be transmitted according to a hopping pattern to facilitate interference mitigation, as mentioned above.

It will be appreciated that, in accordance with one or more aspects described herein, inferences can be made regarding selecting resources to utilize in defining the new control region, determining multiplexing strategies or hopping patterns, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
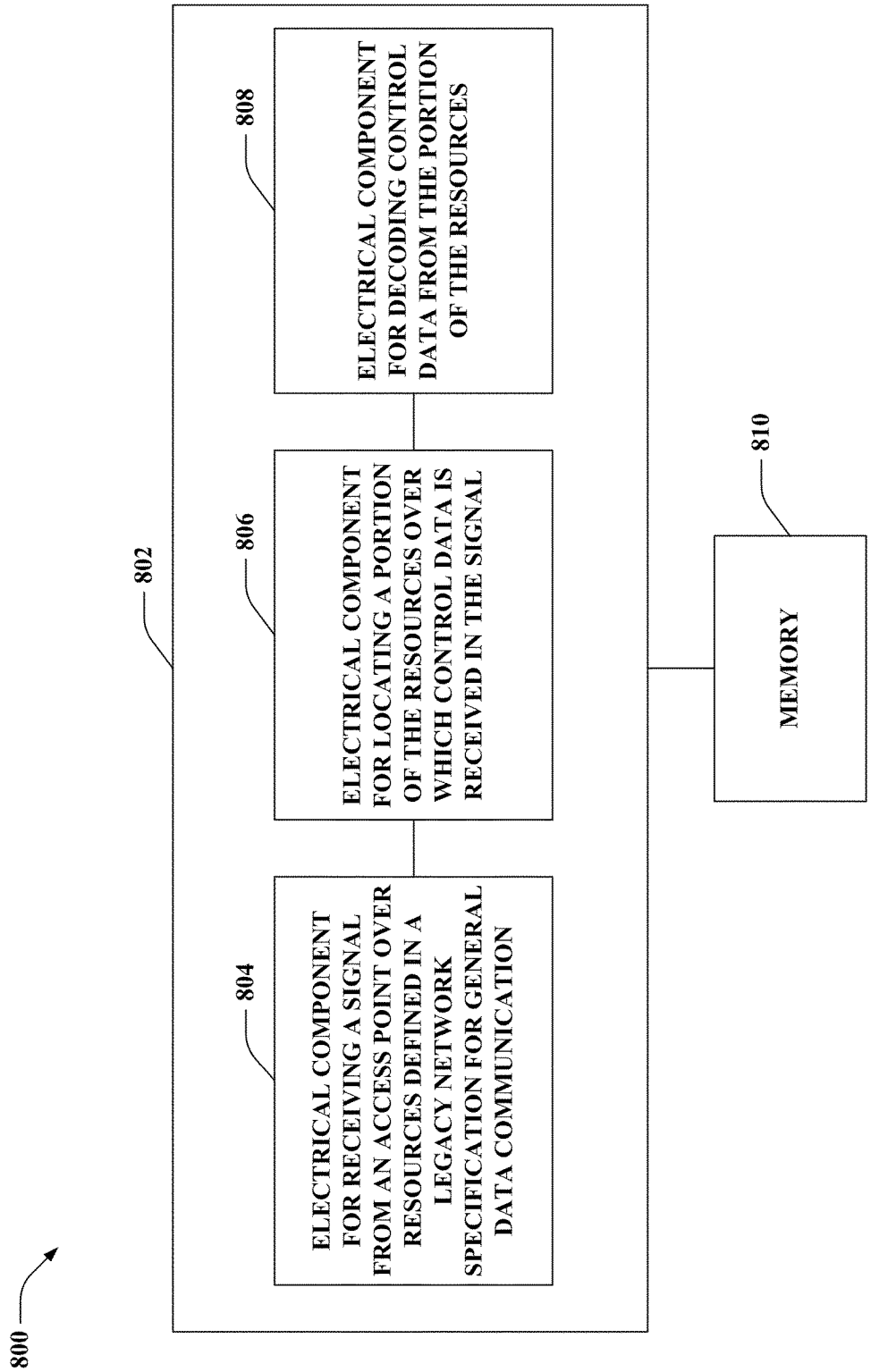
FIG. 8 is a block diagram of an example apparatus that receives control data and relevant information regarding a new control region.

With reference to FIG. 8, illustrated is a system 800 that receives signals comprising control data over a newly defined control region. For example, system 800 can reside at least partially within a base station, mobile device, or another device that provides access to a wireless network. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving a signal from an access point over resources defined in a legacy network specification for general data communication 804. For example, as described, the legacy network specification can be a 3GPP LTE specification where the resources are defined for PDSCH transmissions. Further, logical grouping 802 can comprise an electrical component for locating a portion of the resources over which control data is received in the signal 806.

In an example, as described, the portion can be located based on information received regarding the new control region, such as a location thereof, location of specific control resources in the control region, a search space, etc. In addition, logical grouping 802 can include an electrical component for decoding control data from the portion of the resources 808. As described, where the control region location is received, portions of resources can be blindly decoded until relevant control data is encountered. Moreover, for example, electrical component 804 can receive multiplexing information that can be used to demultiplex received signals into various control and/or general data channels over which data can be decoded. Also, in an example, explicit control resources can be decoded where location of such resources is received via dedicated signal. Additionally, system 800 can include a memory 810 that retains instructions for executing functions associated with electrical components 804, 806, and 808. While shown as being external to memory 810, it is to be understood that one or more of electrical components 804, 806, and 808 can exist within memory 810.

Figure 9:
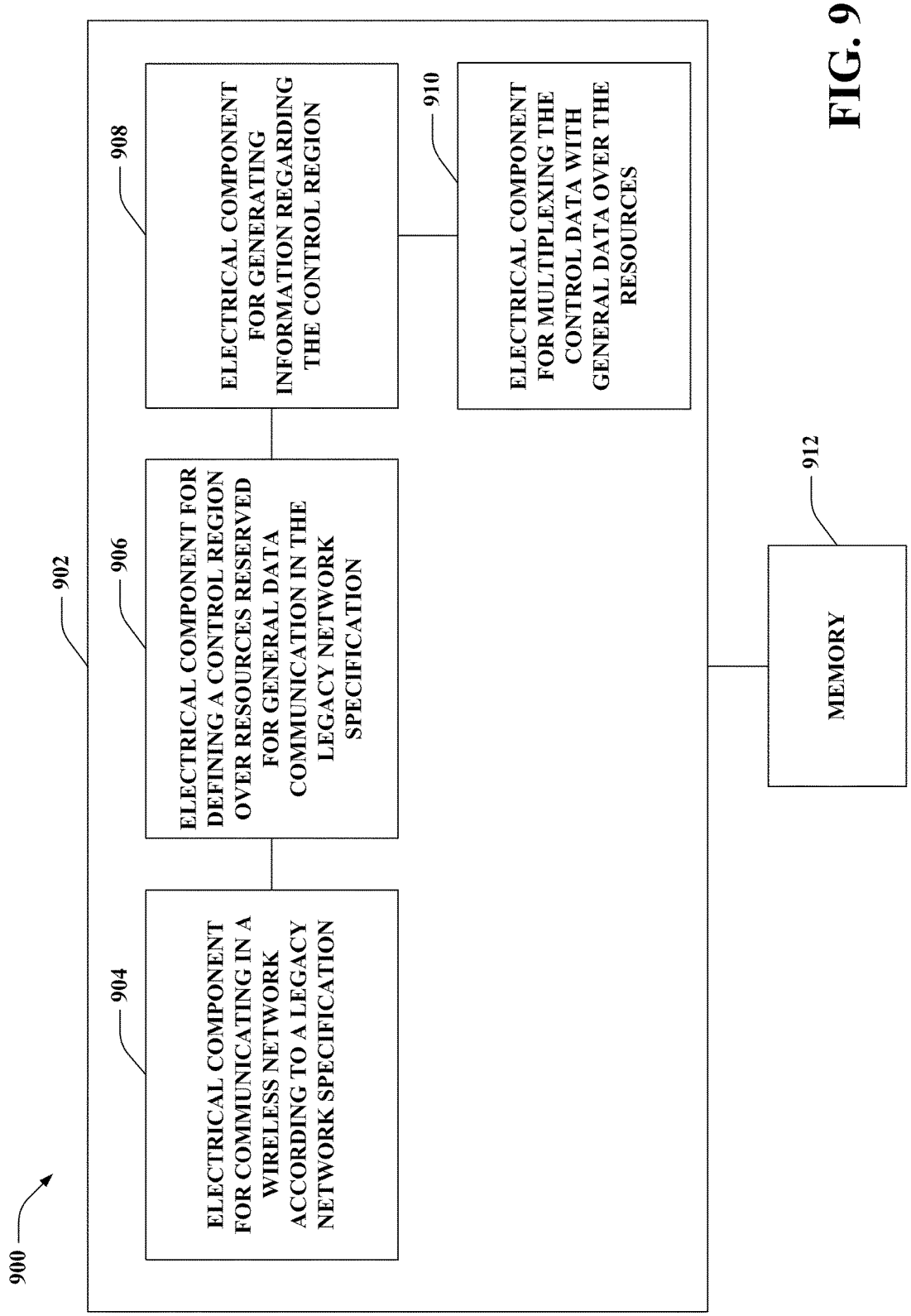
FIG. 9 is a block diagram of an example apparatus that facilitates transmitting control data in a new control region along with information regarding the new control region.

With reference to FIG. 9, illustrated is a system 900 that transmits control data in a general data region defined by a legacy network specification. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for communicating in a wireless network according to a legacy network specification 904. For example, the electrical component 904 can communicate with legacy wireless devices according to the specification. As described the specification can identify resources reserved for communicating control and general data. In one example, the legacy network specification can be a 3GPP LTE specification defining PDSCH resources. Further, logical grouping 902 can comprise an electrical component for defining a control region over resources reserved for general data communication in the legacy network specification 906. As described, in the previous example the control region can be defined in the PDSCH resources to expand available control resources, and the electrical component 904 can transmit control data in the control region.

Moreover, logical grouping 902 includes an electrical component for generating information regarding the control region 908. Electrical component 904 can communicate the information to one or more wireless devices receiving control data to facilitate decoding in the control region. As described, the information can relate to location of the control region, location of specific control resources (transmitted by electrical component 904 in a dedicated signal), etc. Furthermore, logical grouping 902 can also include an electrical component for multiplexing the control data with general data over the resources 910. As described, a variety of multiplexing schemes are possible, such as allocating one control resources per resource block and filling the remainder with general data, allocating all control resources to contiguous resource blocks and filling left over space with general data, and/or the like. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
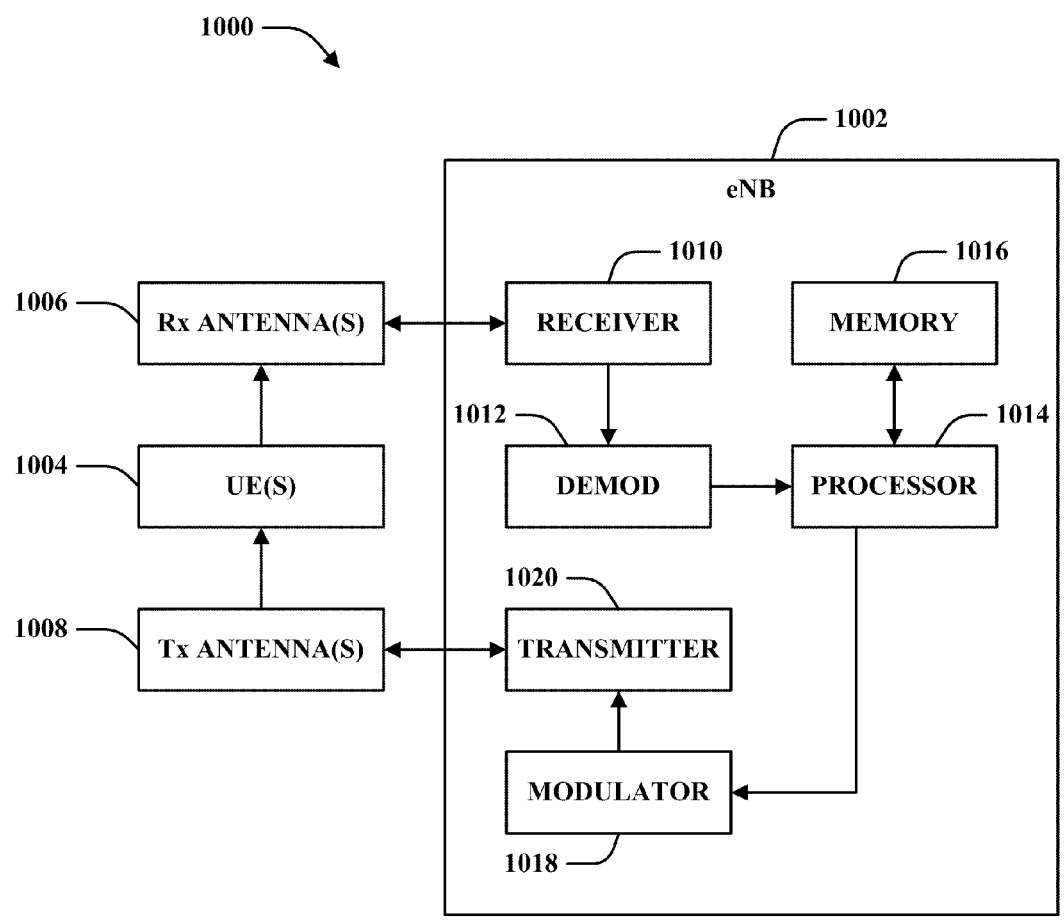
FIGS. 10-11 are block diagrams of example wireless communication devices that can be utilized to implement various aspects of the functionality described herein.

FIG. 10 is a block diagram of a system 1000 that can be utilized to implement various aspects of the functionality described herein. In one example, system 1000 includes a base station or eNB 1002. As illustrated, eNB 1002 can receive signal(s) from one or more UEs 1004 via one or more receive (Rx) antennas 1006 and transmit to the one or more UEs 1004 via one or more transmit (Tx) antennas 1008. Additionally, eNB 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, eNB 1002 can employ processor 1014 to perform methodologies 600, 700, and/or other similar and appropriate methodologies. eNB 1002 can also include a modulator 1018 that can multiplex a signal for transmission by a transmitter 1020 through transmit antenna(s) 1008.

Figure 11:
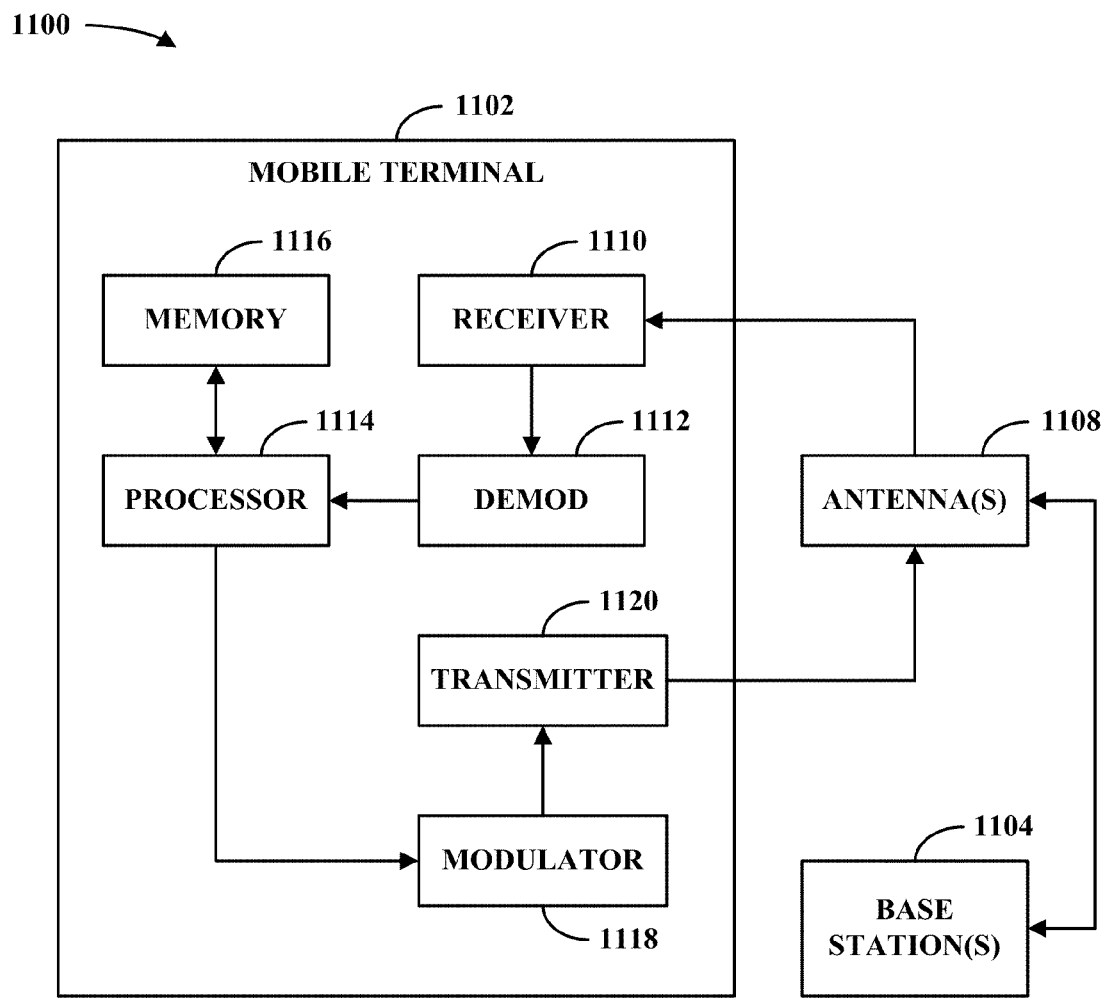

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 600, 700, and/or other similar and appropriate methodologies. Mobile terminal 1102 can also employ one or more components described in previous figures to effectuate the described functionality; in one example, the components can be implemented by the processor 1114. Mobile terminal 1102 can also include a modulator 1118 that can multiplex a signal for transmission by a transmitter 1120 through antenna(s) 1108.

Figure 12:
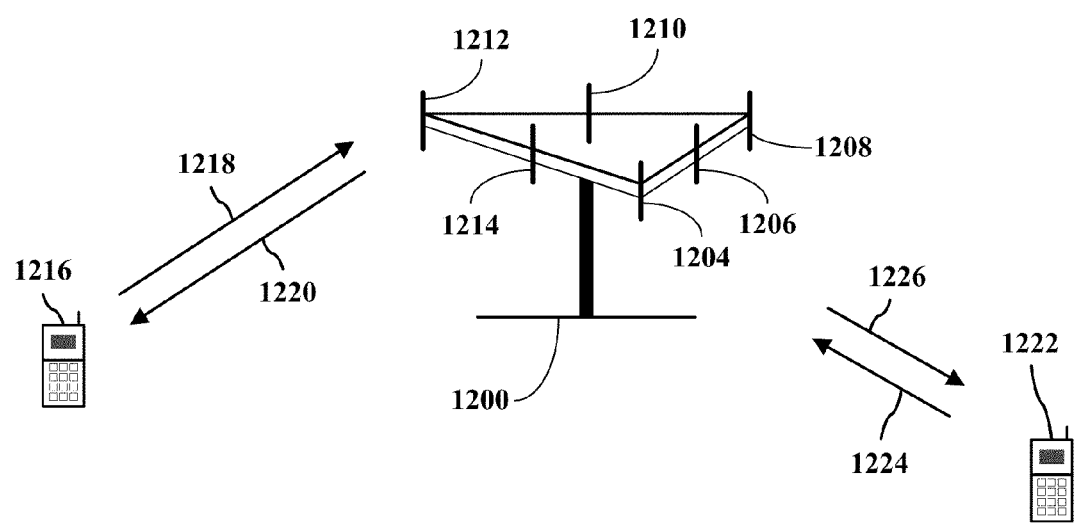
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
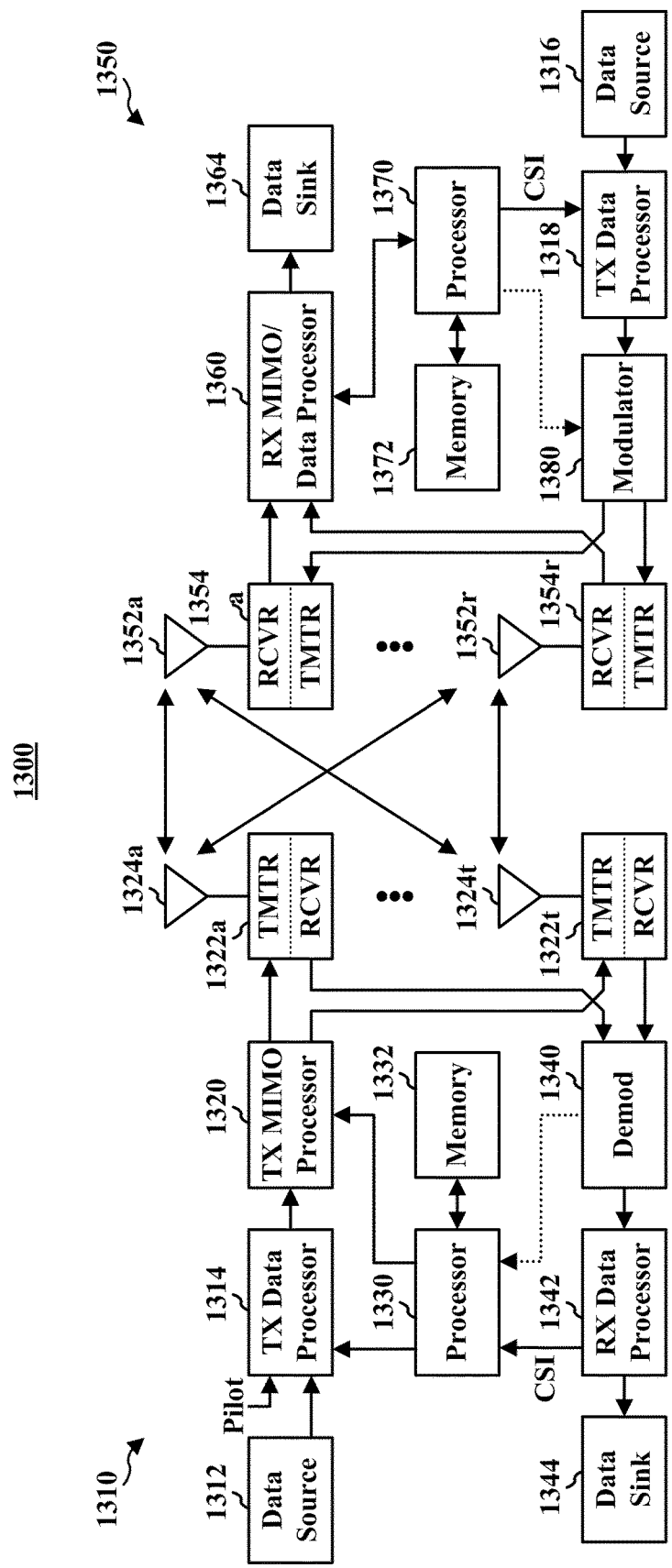
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1316 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling /equalization and interference cancellation" receiver processing techniques, which can also be referred to as "successive interference cancellation" or "successive cancellation" receiver processing techniques.

The following are examples of LTE-Advanced (LTE-A) control multiplexing. In an example of downlink control, downlink control for Release 8 UEs is sent on a Release 8 compatible carrier. Control is intended for that downlink carrier only or for the corresponding paired uplink carrier. A legacy control region is retained, which may be the first n OFDM symbols, as defined by PCFICH. LTE-A UEs can get control channels on the legacy control region and on a new control region. A common control may be located on the legacy control region. UE specific control may be on either the legacy control region or the new control region.

In an example of a Release 8 non-backward compatible control region, the resources are devoted to the new control region only if it is needed. The need for the new control region may include: insufficient legacy control space because of larger size of multicarrier assignments and larger number of UEs to be addressed, new (multicarrier) DCI formats with large size can be supported without concern for whether the 8 CCE aggregation level is sufficient, or special operation mode of LTE-A UEs.

Figure 14:
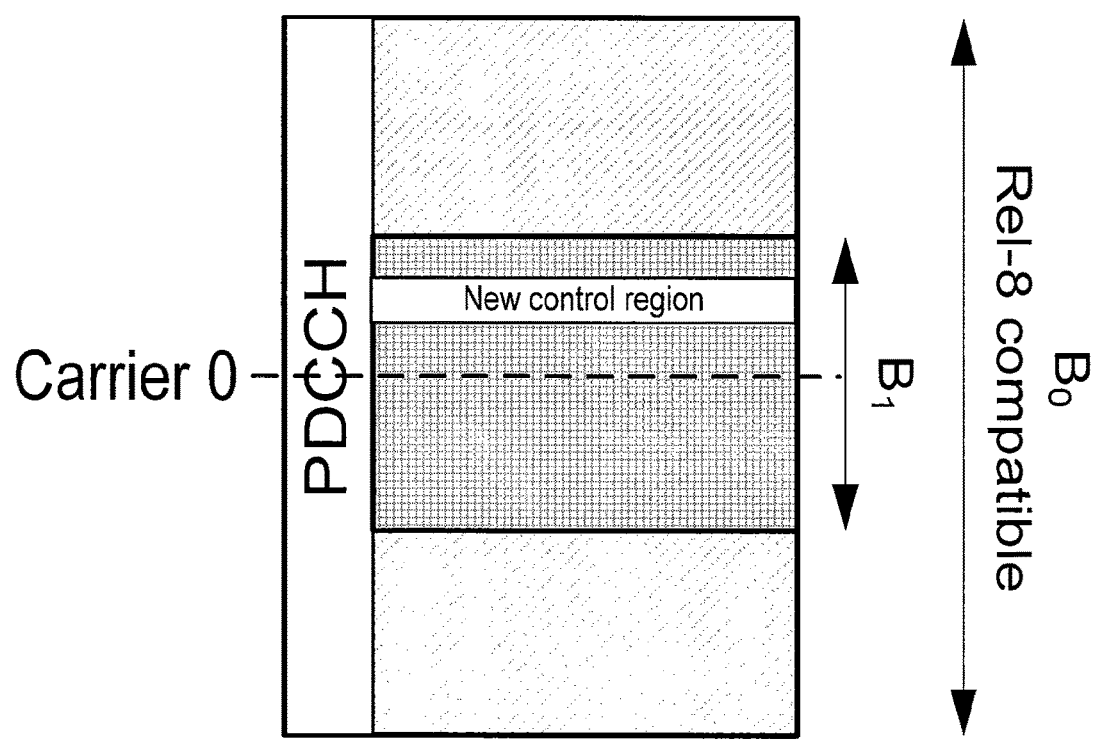
FIG. 14 illustrates an example of downlink control in a new control region.

In an example of downlink control in the new control region is illustrated in FIG. 14. An LTE-A UE with low data rate requirements, such as a Voice over Internet Protocol (VoIP) UE, may be configured to receive data only on the bandwidth segment smaller than 20 MHz carrier to improve power consumption. Since Release 8 PDCCH spans the whole carrier band, such UE would rely on the new control region in the part of the segment band it operates.

The Release 8 non-backward compatible control region may be located within the data channel region. The exact location of the new control region defined in a multicarrier System Information Block (SIB) could be in any of the carrier/segments. Building blocks may be smaller than the RB, and may not span the whole slot. Several configurations may support different scenarios. Micro-sleep is possible with certain configurations.

In an example of downlink control in the new control region, FDM structure of multiple control channels may span multiple OFDM symbols in time and could provide improved coverage. Multiple distributed resource blocks across frequency and hopping may provide frequency diversity. Inter-cell interference coordination could provide better performance of the control channel than in the legacy control region.

Figure 15:
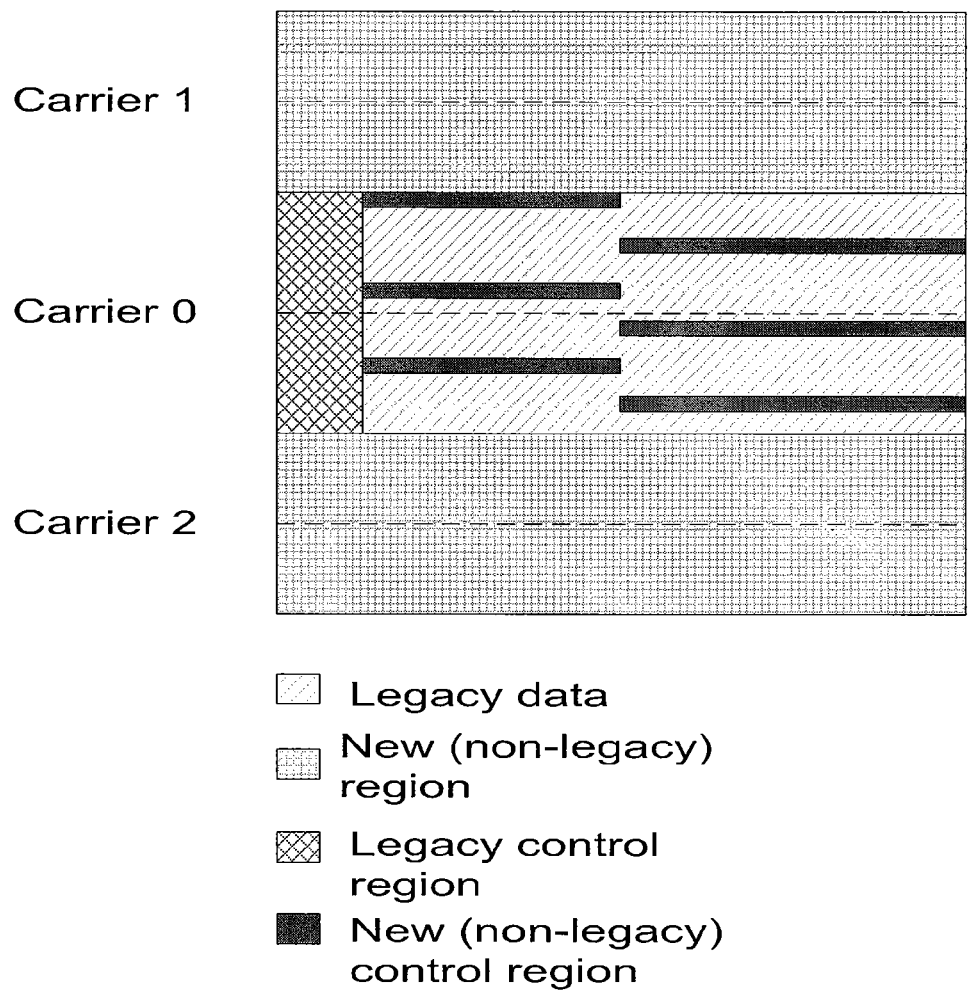
FIG. 15 provides an example of downlink control resources in a new control region within the Release 8 PDSCH on a backward compatible carrier.
Figure 16:
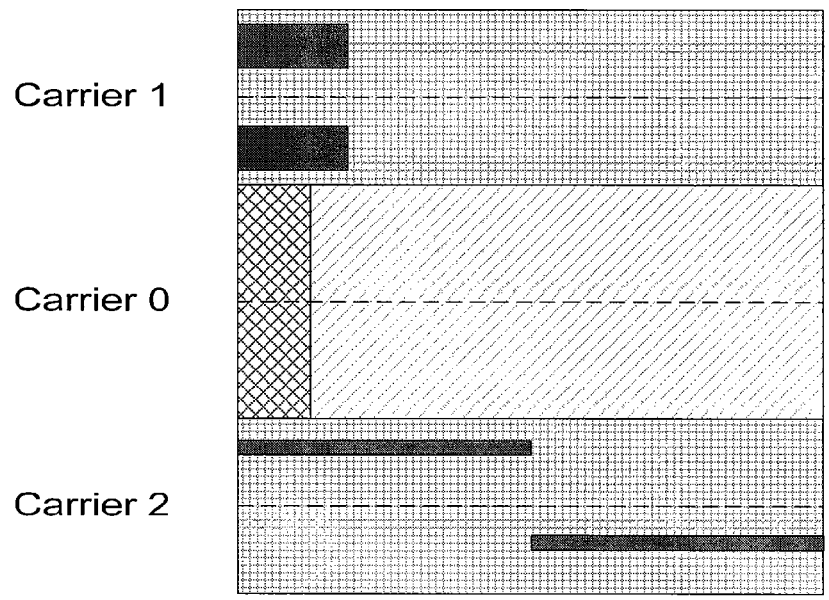
FIG. 16 provides an example of downlink control resources in the new control region within a non-backward compatible carrier.
Figure 17:
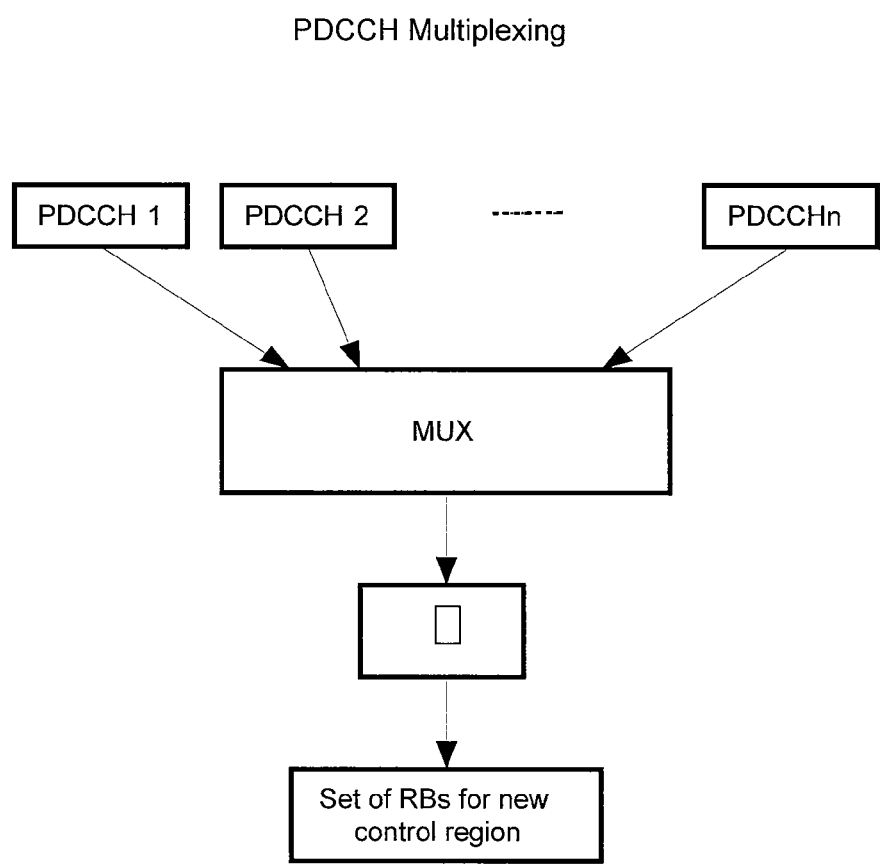
FIG. 17 provides an example of PDCCH multiplexing.

FIG. 15 provides an example of downlink control resources in the new control region within the Release 8 PDSCH on a backward compatible carrier. FIG. 16 provides an example of downlink control resources in the new control region within the non-backward compatible carrier. FIG. 17 provides an example of PDCCH multiplexing.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving, by a processor, a signal from an access point over resources reserved for non-control data communication in a first network specification;
   receiving, by the processor, information regarding a control region, the information comprising a frequency scheme for the control region and a multiplexing scheme for the control region that indicates that control data is multiplexed with other control data,
      wherein the control region is defined within the resources, and
      wherein the control region is associated with a second network specification;
   determining, by the processor, a location of the control data within the resources based at least in part on the information; and
   decoding, by the processor, the control data from a portion of the signal received at the location within the resources.

2. The method of claim 1, wherein the receiving the information includes determining the information according to a wireless network specification.

3. The method of claim 1, wherein the receiving the information includes receiving the information from the access point.

4. The method of claim 1, wherein the receiving the information includes receiving information identifying a location of the control region.

5. The method of claim 1, wherein the decoding control data includes blindly decoding one or more portions of the control region to locate relevant control data.

6. The method of claim 1, wherein the receiving the information includes receiving the information in a dedicated signal and the information comprises specific location or search space for the control data.

7. The method of claim 1, wherein the multiplexing scheme indicates that control data corresponding to a control channel is multiplexed with the non-control data within a single resource block.

8. The method of claim 7, wherein the multiplexing scheme indicates that the control data corresponding to the control channel precedes the non-control data within the single resource block.

9. The method of claim 1, wherein the other control data is disparate control data.

10. The method of claim 1, wherein the the multiplexing scheme further indicates that non-control data is multiplexed with the control data or disparate control data in a resource block that is a last resource block.

11. The method of claim 1, wherein the first network specification is a third generation partnership project (3GPP) long term evolution (LTE) specification, and the resources are reserved for physical downlink shared channels (PDSCH) in the 3GPP LTE specification.

12. A wireless communications apparatus, comprising:
at least one processor configured to:
receive a signal from an access point over resources allocated for non-control data communications in a first network specification;
receive information regarding a control region, the information comprising a frequency scheme for the control region and a multiplexing scheme for the control region that indicates that control data is multiplexed with other control data,
wherein the control region is defined within the resources, and
wherein the control region is associated with a second network specification;
discern a location of the control data in the resources based at least in part on the information; and
decode the control data from a portion of the signal received over the resources based at least in part on the location; and
a memory coupled to the at least one processor.

13. The wireless communications apparatus of claim 12, wherein the at least one processor receives the information from a wireless network specification.

14. The wireless communications apparatus of claim 12, wherein the at least one processor receives the information from the access point.

15. The wireless communications apparatus of claim 12, wherein the other control data is disparate control data, and resource block is a last resource block.

16. The wireless communications apparatus of claim 12, wherein the multiplexing scheme indicates that control data corresponding to a control channel is multiplexed with the non-control data within a single resource block.

17. The wireless communications apparatus of claim 16, wherein the multiplexing scheme indicates that the control data corresponding to the control channel precedes the non-control data within the single resource block.

18. An apparatus, comprising:
means for receiving a signal from an access point over resources defined in a first network specification for non-control data communication, wherein the means for receiving is configured to receive information regarding a control region, the information comprising a frequency scheme for the control region and a multiplexing scheme for the control region that indicates that control data is multiplexed with other control data,
wherein the control region is defined within the resources, and
wherein the control region is associated with a second network specification;
means for locating a portion of the resources over which the control data is received in the signal based at least in part on the information; and
means for decoding the control data from the portion of the resources.

19. The apparatus of claim 18, wherein the means for locating the portion of the resources locates the portion of the resources based at least in part on a wireless network specification.

20. The apparatus of claim 18, wherein the means for receiving the signal receives location information from the access point, and the means for locating the portion of the resources locates the portion of the resources based at least in part on the received location information.

21. The apparatus of claim 18, wherein
the other control data is disparate control data, and
resource block is a last resource block.

22. The apparatus of claim 18, wherein the multiplexing scheme indicates that control data corresponding to a control channel is multiplexed with the non-control data within a single resource block.

23. The apparatus of claim 22, wherein the multiplexing scheme indicates that the control data corresponding to the control channel precedes the non-control data within the single resource block.

24. A computer program product, comprising: a non-transitory computer-readable medium comprising:
code for causing at least one computer to receive a signal from an access point over resources reserved for non-control data communication in a first network specification;
code for causing the at least one computer to receive information regarding a control region, the information comprising a frequency scheme for the control region and a multiplexing scheme for the control region that indicates that control data is multiplexed with other control data,
wherein the control region is defined within the resources, and
wherein the control region is associated with a second network specification;
code for causing the at least one computer to determine location of the control data within the resources based at least in part on the information; and
code for causing the at least one computer to decode the control data from a portion of the signal received at the location within the resources.

25. The computer program product of claim 24, wherein the code for causing the at least one computer to receive the information determines the information from a wireless network specification.

26. The computer program product of claim 24, wherein the code for causing the at least one computer to receive the information receives the information from the access point.

27. The computer program product of claim 24, wherein the other control data is disparate control data, and resource block is a last resource block.

28. The computer program product of claim 24, wherein the multiplexing scheme indicates that control data corresponding to a control channel is multiplexed with the non-control data within a single resource block.

29. The computer program product of claim 28, wherein the multiplexing scheme indicates that the control data corresponding to the control channel precedes the non-control data within the single resource block.

30. An apparatus, comprising:
a receiving component that receives a signal from an access point over resources defined in a first network specification for non-control data communication, wherein the receiving component is configured to receive information regarding a control region, the information comprising a frequency scheme for the control region and a multiplexing scheme for the control region that indicates that control data is multiplexed with other control data,
wherein the control region is defined within the resources, and
wherein the control region is associated with a second network specification;
a control region determining component that locates a portion of the resources over which the control data is received in the signal based at least in part on the information; and
a control data decoding component that decodes the control data from the portion of the resources.

31. The apparatus of claim 30, wherein the control region determining component locates the portion of the resources based at least in part on a wireless network specification.

32. The apparatus of claim 30, wherein the receiving component obtains location information from the access point, and the control region determining component locates the portion of the resources based at least in part on the obtained location information.

33. The apparatus of claim 30, wherein
the other control data is disparate control data, and
resource block is a last resource block.

34. The apparatus of claim 30, wherein the multiplexing scheme indicates that control data corresponding to a control channel is multiplexed with the non-control data within a single resource block.

35. The apparatus of claim 34, wherein the multiplexing scheme indicates that the control data corresponding to the control channel precedes the non-control data within the single resource block.

36. A method, comprising:
communicating, by a processor, in a wireless network according to a first network specification;
defining, by the processor, a control region over resources reserved for non-control data communication,
wherein the resources are reserved for the non-control data communication according to the first network specification, and
wherein the control region is associated with a second network specification;
transmitting, by the processor, control data in the control region to one or more wireless devices; and
implementing, by the processor, a frequency scheme for subsequent control data transmissions to provide interference mitigation based on the transmitted control data and a multiplexing scheme for the control region that indicates that control data is multiplexed with other control data.

37. The method of claim 28, further comprising transmitting information regarding the control region to the one or more wireless devices.

38. The method of claim 37, wherein the transmitting information includes transmitting a system information block (SIB) indicating location of the control region.

39. The method of claim 37, wherein the transmitting information includes transmitting a dedicated signal to the one or more wireless devices explicitly identifying location of control data or a search space relevant to the one or more wireless devices.

40. The method of claim 28, further comprising multiplexing the control data with the non-control data or disparate control data in a single resource block,
wherein the non-control data is related to the one or more wireless devices.

41. The method of claim 28, further comprising transmitting multiplexing scheme information related to the multiplexing scheme to the one or more wireless devices.

42. The method of claim 36, further comprising multiplexing the control data with disparate control data over contiguous resource blocks.

43. The method of claim 42, wherein the resource block is a last resource block of the contiguous resource blocks.

44. The method of claim 36, wherein the first network specification is a third generation partnership project (3GPP) long term evolution (LTE) specification and the resources are reserved for physical downlink shared channel (PDSCH) communication.

45. A wireless communications apparatus, comprising:
at least one processor configured to:
communicate with one or more devices in a wireless network using a first network specification;
create a control region for transmitting control data in resources allocated for communication of non-control data,
wherein the resources are allocated for the communication of the non-control data according to the first network specification, and
wherein the control region is associated with a second network specification;
transmit control data in the control region to one or more wireless devices; and
implement a frequency scheme for subsequent control data transmissions to provide interference mitigation and a multiplexing scheme for the control region that indicates that control data is multiplexed with other control data; and
a memory coupled to the at least one processor.

46. The wireless communications apparatus of claim 45, wherein the at least one processor is further configured to transmit information regarding the control region to the one or more wireless devices.

47. An apparatus, comprising:
means for communicating in a wireless network according to a first network specification;
means for defining a control region over resources reserved for non-control data communication,
wherein the resources are reserved for non-control data communication according to the first network specification, wherein the means for communicating in the wireless network transmits control data in the control region to one or more wireless devices, and wherein the control region is associated with a second network specification; and means for implementing a frequency scheme for subsequent control data transmissions to provide interference mitigation and a multiplexing scheme for the control region that indicates that control data is multiplexed with other control data.

48. The apparatus of claim 47, further comprising means for generating information regarding the control region, wherein the means for communicating in the wireless network transmits the generated information to the one or more wireless devices.

49. The apparatus of claim 48, wherein the means for generating the information creates a system information block (SIB) comprising a location of the control region within the resources.

50. The apparatus of claim 48, wherein the means for generating the information creates a dedicated signal for the one or more wireless devices that specifies a location of control data relevant to the one or more wireless devices.

51. A computer program product, comprising: a non-transitory computer-readable medium comprising:

code for causing at least one computer to communicate in a wireless network according to a first network specification;

code for causing the at least one computer to define a control region over resources reserved for non-control data communication, wherein the resources are reserved for the non-control data communication according to the first network specification, and wherein the control region is associated with a second network specification;

code for causing the at least one computer to transmit control data in the control region to one or more wireless devices; and code for causing the at least one computer to implement frequency hopping for subsequent control data transmissions to provide interference mitigation and a multiplexing scheme for the control region that indicates that control data is multiplexed with other control data.

52. The computer program product of claim 51, wherein the computer-readable medium further comprises code for causing the at least one computer to transmit information regarding the control region to the one or more wireless devices.

53. An apparatus, comprising:

a transmitting component that communicates in a wireless network according to a first network specification; and a control region defining component that creates a control region over resources reserved for non-control data communication, wherein the resources are reserved for the non-control data communication according to the first network specification, wherein the control region is associated with a second network specification, wherein the transmitting component provides control data in the control region to one or more wireless devices, and wherein the control region defining component implements a frequency scheme for subsequent control data transmissions to provide interference mitigation and a multiplexing scheme for the control region that indicates that control data is multiplexed with other control data.

54. The apparatus of claim 53, further comprising a control region indicating component that generates information regarding the control region, wherein the transmitting component provides the generated information to the one or more wireless devices.

* * * * *